(12) United States Patent
Moore

(10) Patent No.: US 10,785,912 B2
(45) Date of Patent: Sep. 29, 2020

(54) END EFFECTORS FOR HARVESTING MACHINES AND METHODS FOR USING END EFFECTORS

(71) Applicant: HarvestMoore, L.L.C., Pasco, WA (US)

(72) Inventor: Francis Wilson Moore, Pasco, WA (US)

(73) Assignee: HarvestMoore, L.L.C., Pasco, WA (US)

(*) Notice: Subject to any disclaimer, the term of this patent is extended or adjusted under 35 U.S.C. 154(b) by 251 days.

(21) Appl. No.: 15/982,952

(22) Filed: May 17, 2018

(65) Prior Publication Data

US 2018/0332769 A1 Nov. 22, 2018

Related U.S. Application Data

(60) Provisional application No. 62/508,039, filed on May 18, 2017.

(51) Int. Cl.
| | | |
|---|---|---|
| *A01D 46/00* | (2006.01) | |
| *A01D 46/26* | (2006.01) | |
| *A01D 46/253* | (2006.01) | |
| *A01D 91/04* | (2006.01) | |
| *A01D 46/30* | (2006.01) | |

(52) U.S. Cl.
CPC ......... *A01D 46/253* (2013.01); *A01D 46/005* (2013.01); *A01D 46/264* (2013.01); *A01D 46/30* (2013.01); *A01D 91/04* (2013.01)

(58) Field of Classification Search
CPC ...... A01D 46/264; A01D 46/26; A01D 46/30; A01D 46/005; A01D 2046/266; A01D 2046/268; A01D 46/253; A01D 91/04
See application file for complete search history.

(56) References Cited

U.S. PATENT DOCUMENTS

| | | | |
|---|---|---|---|
| 2,288,682 | A | 7/1942 | Chittenden |
| 2,443,027 | A | 6/1948 | Dishmaker |
| 2,553,463 | A | 5/1951 | McCulloch |
| 2,968,907 | A | 1/1961 | Bernheim |
| 3,165,833 | A | 1/1965 | Logan |
| 3,165,880 | A | 1/1965 | Buie |
| 3,182,827 | A | 5/1965 | Frost |
| 3,277,572 | A | 10/1966 | Eickenberg |
| 3,365,870 | A | 1/1968 | Cardinale |
| 3,389,543 | A * | 6/1968 | Clark ................... A01D 46/253 56/337 |

(Continued)

FOREIGN PATENT DOCUMENTS

EP 0267860 A2 5/1988

OTHER PUBLICATIONS

WO PCT/US2010/046678 Srch Rpt, dated Apr. 28, 2011, Moore.

(Continued)

*Primary Examiner* — Robert E Pezzuto
*Assistant Examiner* — Adam J Behrens
(74) *Attorney, Agent, or Firm* — Wells St. John P.S.

(57) ABSTRACT

An end effector for harvesting fruit. The end effector includes a collection device that has an opening with a plurality of prongs over the opening. The end effector also has an oscillating device secured to, and in an oscillating relationship with, the plurality of prongs.

17 Claims, 6 Drawing Sheets

(56) References Cited

U.S. PATENT DOCUMENTS

| | | | | |
|---|---|---|---|---|
| 3,401,514 | A * | 9/1968 | Clark | A01D 46/24 56/328.1 |
| 3,460,327 | A * | 8/1969 | Johnson | A01D 46/005 56/328.1 |
| 3,460,328 | A * | 8/1969 | Lee | A01D 46/24 56/328.1 |
| 3,460,330 | A | 8/1969 | Black | |
| 3,507,107 | A | 4/1970 | Harms | |
| 3,561,205 | A * | 2/1971 | Baker | A01D 46/24 56/328.1 |
| 3,564,826 | A | 2/1971 | Middleton | |
| 3,591,949 | A * | 7/1971 | Connery | A01D 46/005 56/332 |
| 3,596,456 | A * | 8/1971 | Quick | A01D 46/00 56/330 |
| 3,621,643 | A | 11/1971 | Garrans | |
| 3,651,627 | A * | 3/1972 | Pitti | A01D 46/264 56/328.1 |
| 3,690,053 | A * | 9/1972 | Thorn | A01D 46/005 56/328.1 |
| 3,713,282 | A * | 1/1973 | Baker | A01D 46/24 56/328.1 |
| 3,756,001 | A | 9/1973 | Macidull | |
| 3,793,814 | A | 2/1974 | Rohrbach | |
| 3,898,785 | A | 8/1975 | Chew | |
| 3,901,005 | A | 8/1975 | Rohrbach | |
| 3,913,307 | A | 10/1975 | Cardinal, Jr. | |
| 3,969,878 | A | 7/1976 | Morganeier | |
| 4,015,366 | A | 4/1977 | Hall | |
| 4,215,451 | A | 8/1980 | Wikoff | |
| 4,482,960 | A | 11/1984 | Pryor | |
| 4,501,113 | A | 2/1985 | Gerber | |
| 4,507,579 | A * | 3/1985 | Turner | H02K 33/14 310/15 |
| 4,519,193 | A | 5/1985 | Yoshida | |
| 4,520,619 | A | 6/1985 | Doi | |
| 4,532,757 | A | 8/1985 | Tutle | |
| 4,606,179 | A | 8/1986 | Peterson | |
| 4,611,461 | A * | 9/1986 | Tyros | A01D 46/253 56/10.5 |
| 4,663,925 | A | 5/1987 | Terada | |
| 4,718,223 | A | 1/1988 | Suzuki | |
| 4,769,700 | A | 9/1988 | Pryor | |
| 4,860,529 | A | 8/1989 | Peterson | |
| 4,975,016 | A | 12/1990 | Pellenc | |
| 4,976,094 | A | 12/1990 | Williamson | |
| 5,005,347 | A | 4/1991 | Kedem | |
| 5,280,697 | A | 1/1994 | Miller | |
| 5,426,927 | A | 6/1995 | Wang | |
| 5,471,827 | A | 12/1995 | Janssen | |
| 5,816,037 | A | 10/1998 | Chiel | |
| 5,946,896 | A * | 9/1999 | Daniels | A01D 46/264 56/328.1 |
| 6,250,056 | B1 | 6/2001 | Spagnolo | |
| 6,425,233 | B1 * | 7/2002 | Hosking | A01D 46/264 56/11.9 |
| 6,442,920 | B1 | 9/2002 | Peterson | |
| 6,553,299 | B1 | 4/2003 | Keller | |
| 6,591,591 | B2 | 7/2003 | Coers | |
| 6,671,582 | B1 | 12/2003 | Hanley | |
| 7,204,072 | B2 | 4/2007 | Joy | |
| 7,418,985 | B2 | 9/2008 | Torgersen | |
| 7,487,809 | B2 | 2/2009 | Uebergang | |
| 7,500,343 | B2 | 3/2009 | Hsia | |
| 7,540,137 | B2 | 6/2009 | Gray | |
| 7,640,091 | B2 | 12/2009 | Berg | |
| 7,765,780 | B2 | 8/2010 | Koselka | |
| 8,381,501 | B2 | 2/2013 | Koselka et al. | |
| 8,442,304 | B2 | 5/2013 | Marrion et al. | |
| 8,938,941 | B2 * | 1/2015 | Minelli | A01D 46/264 56/332 |
| 9,357,708 | B2 * | 6/2016 | Chang | A01D 46/26 |
| 9,439,354 | B2 * | 9/2016 | Minelli | A01D 46/264 |
| 2002/0062635 | A1 * | 5/2002 | Hosking | A01D 46/264 56/340.1 |
| 2005/0039431 | A1 | 2/2005 | Schloesser | |
| 2005/0126144 | A1 | 6/2005 | Koselka | |
| 2006/0026940 | A1 | 2/2006 | Carter | |
| 2006/0150602 | A1 | 7/2006 | Stimmann | |
| 2006/0213167 | A1 | 9/2006 | Koselka et al. | |
| 2008/0010961 | A1 | 1/2008 | Gray | |
| 2008/0264030 | A1 | 10/2008 | Bryan | |
| 2008/0279460 | A1 | 11/2008 | Kasahara | |
| 2009/0293442 | A1 * | 12/2009 | Chang | A01D 46/26 56/328.1 |
| 2010/0212279 | A1 | 8/2010 | Macidull | |
| 2011/0022231 | A1 | 1/2011 | Walker | |
| 2014/0283495 | A1 | 9/2014 | Christensen | |
| 2016/0057940 | A1 | 3/2016 | Lyons | |

OTHER PUBLICATIONS

WO PCT/US2010/046678 Wtn Opn, dated Apr. 28, 2011, Moore.

Gorte, et al., "Structuring Laser-Scanned Trees Using 3D Mathematical Morphology", ResearchGate Conference Paper, Jan. 2004, 6 pgs.

* cited by examiner

END EFFECTORS FOR HARVESTING MACHINES AND METHODS FOR USING END EFFECTORS

CROSS REFERENCE TO RELATED APPLICATION

This application claims benefit of U.S. Provisional Patent Application No. 62/508,039 filed on May 18, 2017.

TECHNICAL FIELD

The subject of this application relates to end effectors for harvesting machines and methods of using same.

BACKGROUND

Current machine harvesters for fruit such as berries employ a shaking method to harvest the berries. That is, the machine harvesters have shaking systems that violently shake the berry bushes with enough force and energy to dislodge (release) the berries from their stems. In fact, the shaking is so violent that immature berries are dislodged from their stems. However, these current harvesting methods and systems with machines damage the berries so extensively that the quality of the berries will not suffice for use in the fresh commercial market. Accordingly, berries currently harvested by a machine are commercially processed into the less desirable and less profitable jellies, jams and other products that do not require fresh berries.

There is a need for harvester systems and methods that will allow for the harvesting of berries with a machine while maintaining the quality of the berries for the fresh commercial market. Still further, there is a need for harvester systems and methods that will allow for the harvesting of mature berries with a machine while leaving immature berries on the stem.

BRIEF DESCRIPTION OF THE DRAWINGS

Exemplary embodiments of the various disclosures are described below with reference to the following accompanying drawings.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

The harvester systems and methods of this invention allow for the harvesting of fruit such as berries with a machine while maintaining the quality of the berries for the fresh commercial market. That is, the berries will not be picked by hand, and yet, the highest quality for the berries will be maintained. Still further, harvester systems and methods of this invention allow for the removal of individual berries from the berry cluster that are ripe and the proper size. Immature berries will remain on the stem to ripen.

The harvester systems and methods of this invention can be used for harvesting blackberries, raspberries, strawberries, huckleberries, and other bush grown berries and meet the standards and requirements for the commercial fresh berry market.

Figure 1:
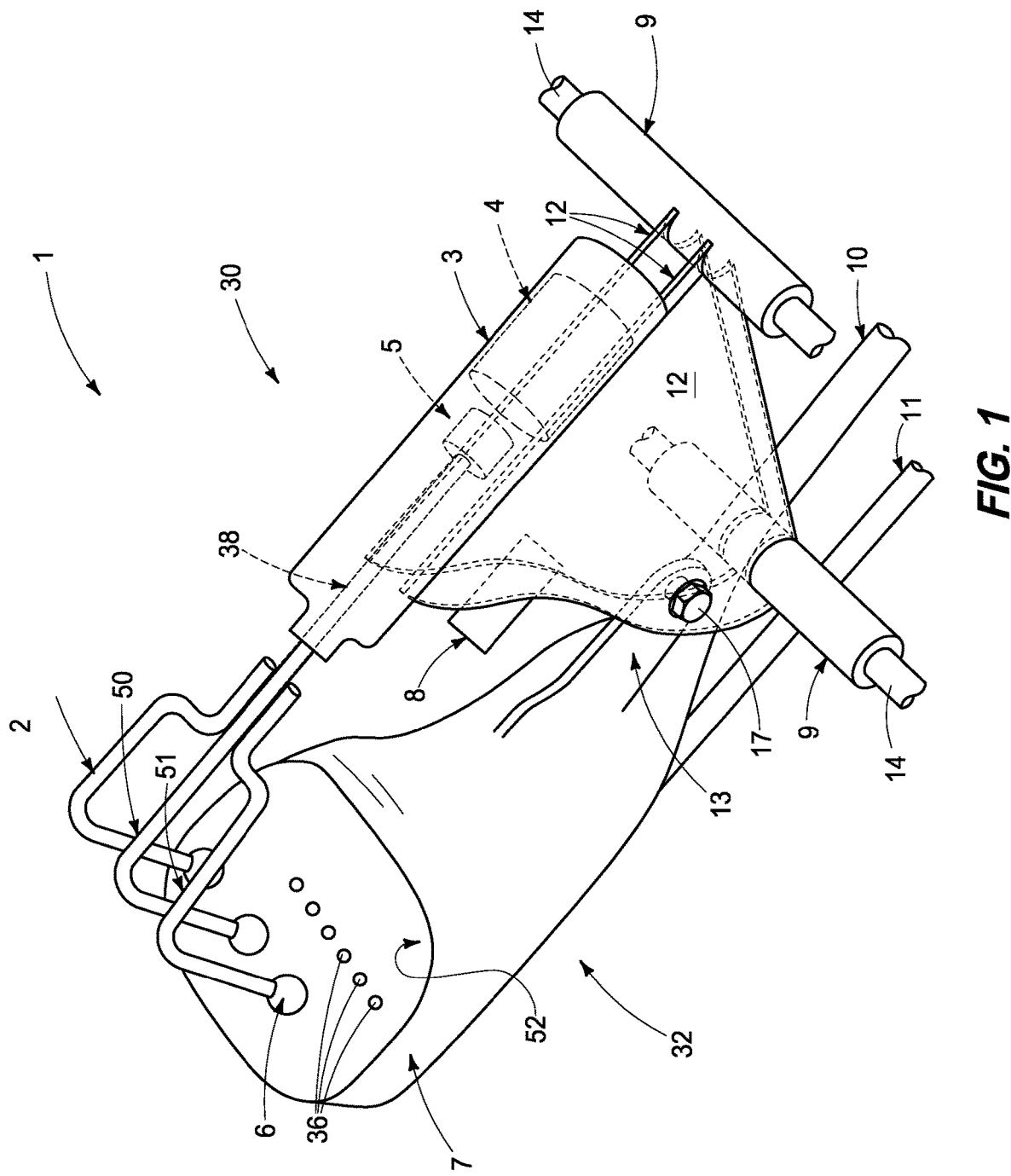
FIG. 1 is a perspective view of an exemplary end effector according to an embodiment of the invention.

Referring to FIG. 1, an exemplary end effector 1 is illustrated according to one embodiment of the invention. The end effector 1 includes a tuning fork device 30 and a collection device 32 both supported upon a support body 12. The support body 12 is between the tuning fork device 30 and the collection device 32. The support body 12 maintains the tuning fork device 30 and collection device 32 in a spaced relationship. Support body 12 is configured as a pair of planar plates shaped generally as triangles. The support body 12 has one side of the triangular configuration as the top portion and supporting the tuning fork device 30. The support body 12 has an angle of the triangular configuration opposite the top portion and in which establishes the bottommost structure of the support body 12. The respective plates of the support body 12 are oriented in a spaced and parallel relationship with each other.

Figure 2:
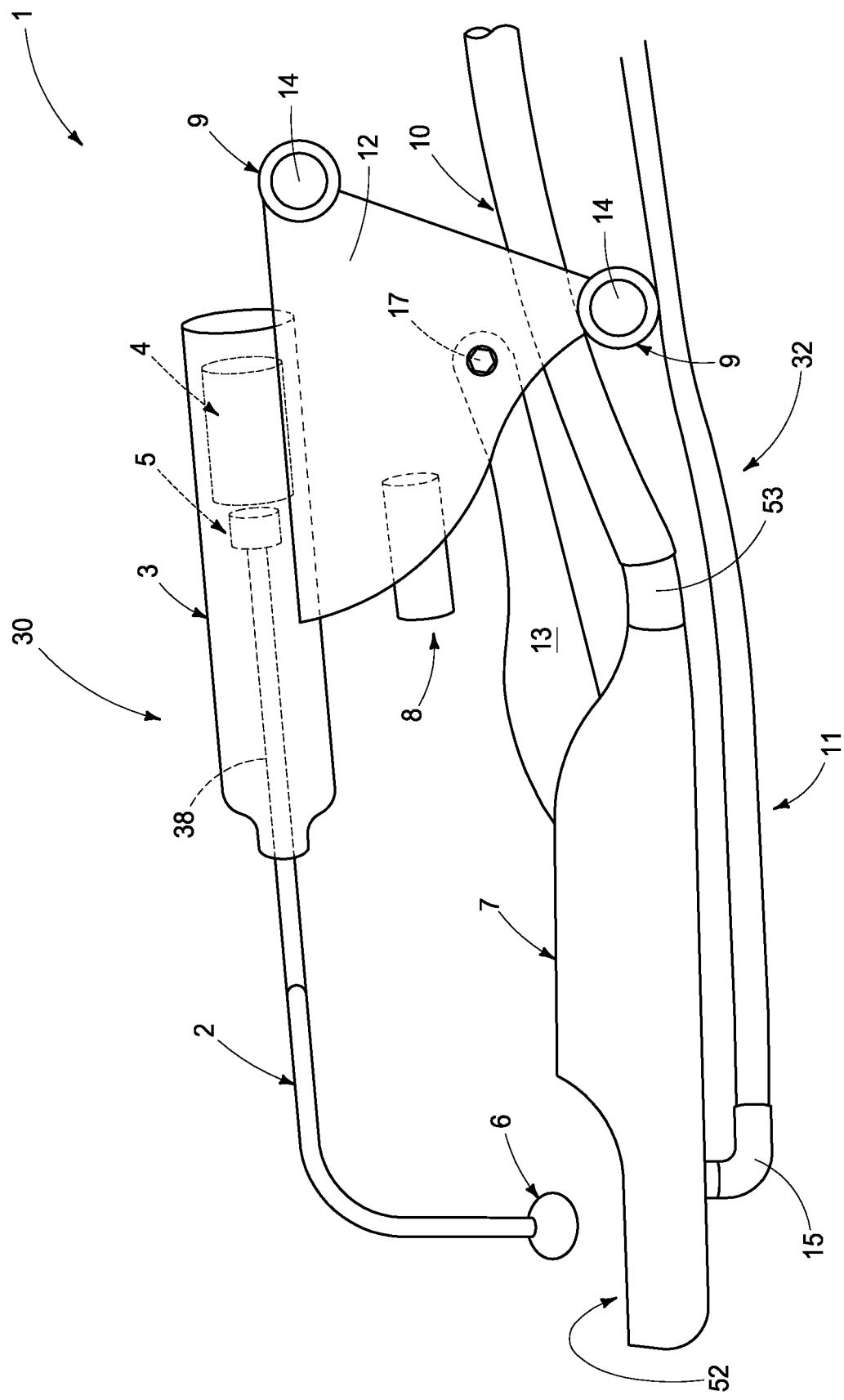
FIG. 2 is a side view of the exemplary end effector of FIG. 1.

Referring to FIGS. 1 and 2, a tubular housing 3 supports and houses a stem 38 of the tuning fork device 30. The stem 38 extends colinearly with a central axis of the tubular housing 3 and exits from one end of the tubular housing 3. The stem 38 is capable of pivoting (vibrating and/or oscillating) at the one end of the tubular housing 3. Ultimately, stem 38 establishes a central prong 50 (or tine) of the tuning fork device 30. The configuration of stem 38 is a linear structure having a circular configuration in the perpendicular cross section. After exiting the tubular housing 3 to establish the central prong 50, central prong 50 continues as a linear structure for a distance and then curves downwardly approximately ninety (90) degrees toward the collection device 32.

A weight 6 is removably secured to an end of the central prong 50. The weight 6 is configured as a sphere and is ultimately used to provide a specific oscillation frequency for central prong 50. Accordingly, providing the removability capability of the weight 6 allows for modification or adjustment of the specific oscillation frequency for central prong 50. That is, replacing the weight 6 with a different magnitude of weight will provide a different specific oscillation frequency for central prong 50. Mating designs for securing weight 6 to the central prong 50 include complimentary threads on the weight 6 and the central prong 50.

Still referring to FIGS. 1 and 2, one embodiment of the tuning fork device 30 includes a total of three prongs 2, 50 and 51 (or tines). Accordingly, two prongs 2 and 51 exist other than the central prong 50 just described. Forward of the tubular housing 3, prongs 2 and 51 are secured on opposite sides of central prong 50. Prongs 2 and 51 are aligned with central prong 50 wherein all three prongs 2, 50 and 51 are on the same plane. Prongs 2 and 51 extend laterally from the central prong 50 (and while all three prongs are on the same plane for a majority of the respective structures, the three prongs are not parallel to each other as they curve away from the central prong 50). Prongs 2 and 51 then curve approximately ninety (90) degrees to continue extending linearly generally parallel with central prong 50 and on the same plane as central prong 50. The three prongs 2, 50 and 51 continue and curve downwardly in alignment at approximately ninety (90) degrees wherein all three prongs 2, 50 and 51 are still generally aligned on the same plane.

All three prongs 2, 50 and 51 terminate in alignment with spherical weights 6 secured to each end of the three prongs 2, 50 and 51. The weights 6 on prongs 2 and 51 provide the same function as previously described with respect to the weight 6 for central prong 50. The weights 6 on prongs 2 and 51 are removable same as previously described with respect to the weight 6 for central prong 50. Moreover, exemplary mating designs for securing weights 6 to the prongs 2, 50 and 51 include complimentary threads on the weight 6 and prongs. In exemplary embodiments, any combination of prongs may, or may not, have weights secured thereon. If the mating design is to be permanent, then the weights can be soldered or glued to the prongs 2, 50 and 51.

It should be understood that each weight 6 on the respective prongs 2, 50 and 51 can have the same magnitude of weight on the respective ends. In this fashion, the three prongs 2, 50 and 51 will have the same specific oscillation frequency (assuming all other aspects are the same). Alternatively, one or more of the three prongs 2, 50 and 51 can have a different magnitude of weight on the respective ends. In this fashion, the one or more of the three prongs 2, 50 and 51 with the different magnitude of weight will have a different specific oscillation frequency. Still a further alternative, all three prongs 2, 50 and 51 can have the same magnitude of weight on the respective ends while one or more of the prongs will have a different composition of materials forming the structures. In this fashion, the one or more of the three prongs 2, 50 and 51 with the different composition will have a different specific oscillation frequency. Still another alternative, one or more prongs 2, 50 and 51 may, or may not, have differing diameters (or differing cross-sectional configurations or thicknesses) to provide differing specific oscillation frequencies between respective prongs.

Still referring to FIGS. 1 and 2, the structure of the stem 38 opposite from the prongs is positioned in, and terminates therein, the tubular housing 3. A magnet 5 is secured to this terminal end of the stem 38 in the tubular housing 3. Additionally, an oscillating device (oscillator or oscillator device) 4 is operatively spaced from the magnet 5 and supported in the tubular housing 3 farther down the linear axis of the tubular housing 3 from the magnet 5. The tubular housing 3 is supported upon upper edges of the support body 12.

Still referring to FIGS. 1 and 2, a camera 8 is supported upon the support body 12 generally half way between the tubular housing 3 and the collection device 32. The camera 8 faces forward toward the prongs 2, 50 and 51 and provides the capability of directing the position of the end effector 1 (via a harvester arm not shown) relative to a cluster of berries. Still further, camera 8 continues to provide information to the harvester machine (not shown) as the end effector 1 moves through the cluster of berries. Additional cameras can be provided. For example, one or more cameras can be provided on the outer sides of respective plates of the support body 12. Moreover, one or more cameras provided on the outer sides of respective plates of the support body 12 can be pointed or directed toward the prongs 2, 50 and 51. Alternatively, one or more cameras can be pointed or directed toward any direction in the three axes of three-dimensional space, for example, directed perpendicularly away from the planar side of respective plates of the support body 12.

While not shown, it should be understood that the tubular housing 3 has a selectively closable opening that provides the capability of access to the inside of the tubular housing 3. In this fashion, the magnet 5 and/or the oscillator 4 can be replaced. Replacing one, or both, of the magnet 5 and the oscillator 4 can ultimately change or modify the oscillation frequency. The magnet 5 is removably secured to the terminal end of the stem 38. Oscillator 4 can be replaced with a different oscillator that is more powerful, or less powerful, than the current oscillator being replaced. Still further, oscillator 4 can be replaced with a different oscillator that implements a different method of oscillating than the current oscillator being replaced.

Still referring to FIGS. 1 and 2, a first or upper sleeve 9 is supported upon rearmost edges of the support body 12 proximate the uppermost edges. A second or lower sleeve 9 is supported upon lowermost edges of the support body 12 at the angle of the triangular configuration of the support body 12 (opposite to the top portion of the triangular configuration discussed previously) which establishes the bottommost structure of the support body 12. Each sleeve 9 is generally centered on the plates of the support body 12 and extend perpendicularly to the planes established by the respective plates of the support body 12.

It should be understood that a pivot pin 14 (or axle) will extend through each sleeve 9. The pivot pins 14 couple (or secure) the end effector 1 to another machine, such as a harvesting machine (or harvester), in a pivoting relationship. This configuration of pivot pins 14 will allow the end effector 1 to pivot on an imaginary axis oriented generally perpendicularly to the plane established by the plates of the support body 12 of end effector 1. It should be understood other pivot configurations could be provided, for example, a single pivot pin provided in a single sleeve. Alternatively, a single ball pivot could be secured to one or more of the plates of the support body 12 which would allow for a pivoting action of the end effector 1 on each of the three axes of three-dimensional space.

Still referring to FIGS. 1 and 2, in the front and top portion of the collection device 32 is an opening 52 located below the prongs 2, 50 and 51. At the bottom of opening 52 in a surface of the collection device 32 structure is a plurality of holes 36 configured in a line. The plurality of holes 36 allow for the release of a fluid directed upwardly through opening 52 and through the prongs 2, 50 and 51. An exemplary fluid is a gas such as air which is provided to force leaves and debris away from the berries to expose the berries to the prongs 2, 50 and 51. Moreover, the driven air also prevents the leaves and debris from blocking (clogging) the opening 52 in the collection device 32. It should be understood that a cover, not shown, can be clamped onto the collection device 32 over the opening 52 to prevent clogging the opening 52.

Figure 4:
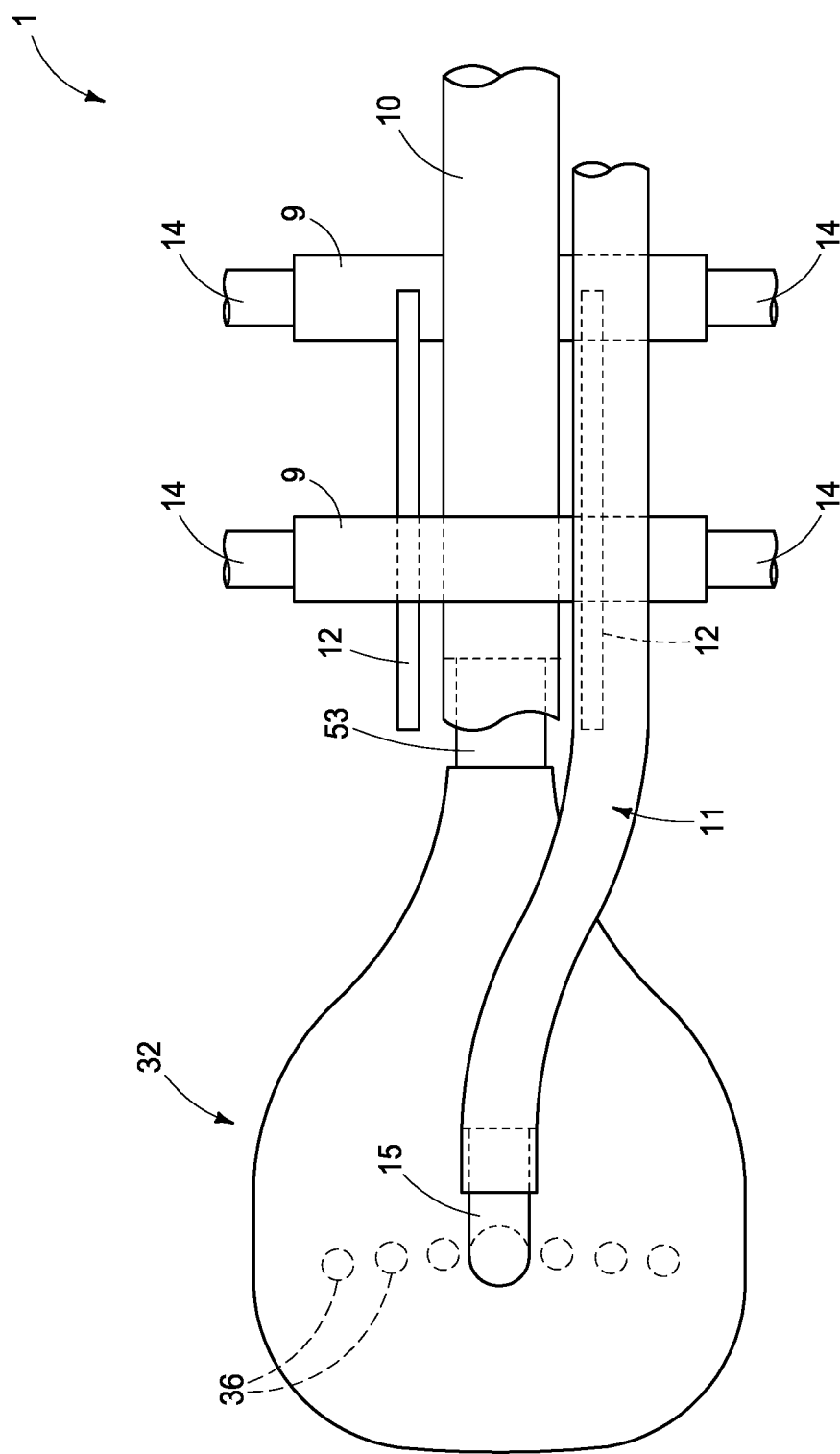
FIG. 4 is a bottom view of the exemplary end effector of FIG. 1.

Referring to FIGS. 2 and 4, a tubular elbow 15 extends from the bottom surface of the collection device 32 generally below the plurality of holes 36. A fluid communication exists between the tubular elbow 15 and the plurality of holes 36. A conduit 11 (or hose, tube) extends from the tubular elbow 15 in fluid communication and is ultimately secured to a fluid source. The tubular elbow 15 provides fluid communication between the conduit 11 and the plurality of holes 36. Accordingly, there is fluid communication from the fluid source to the plurality of holes 36. Ultimately, a fluid such as a gas will move, as stated previously, through the plurality of the holes 36 from the fluid source.

For all the end effectors disclosed in this document, and all parts, sections and components discussed herein, the following is information that is applicable. An exemplary range of pressures for the fluid (such as a gas) that moves through the plurality of the holes 36 from the fluid source of an exemplary end effector include 3 inches Hg (inHg) to 10 inHg. In one embodiment, a specific example is 6 inHg. An exemplary range of types gases that moves through the plurality of the holes 36 include air, inert gases, nitrogen, oxygen ($O_2$), nitrogen ($N_2$), helium, argon, carbon dioxide ($CO_2$), acetylene ($C_2H_2$), propane ($C_3H_8$), butane ($C_4H_{10}$), nitrous oxide ($N_2O$) and freon (various chlorofluorocarbons).

Referring to FIGS. 1 and 4, and as the structure of the collection device 32 extends rearwardly from opening 52, the width of the collection device 32 diminishes. That is, the width of the collection device 32 narrows ultimately establishing another opening at an end of the collection device 32 opposite the opening 52 at the other end. The another opening at the end of the collection device 32 receives a tubular coupler 53 and a conduit 10 is provided over an end of the tubular coupler 53 opposite the collection device 32. Conduit 10 (or hose, tube) is ultimately secured to a vacuum source, and therefore, conduit 10 can be referenced as a vacuum hose. In this configuration, a vacuum is provided from the vacuum source, through the conduit 10, through the tubular coupler 53, through the collection device 32 and establishing a vacuum at opening 52. Ultimately, once the berries are released from their stems by the prongs 2, 50 and 51, the vacuum will pull the released berries into and through the collection device 32 into the conduit 10 to eventually reach the harvester.

Again referring to FIGS. 1 and 2, a connection arm 13 extends rearwardly from an upper surface of the collection device 32 and terminates between the plates of the support body 12. The terminal end of the connection arm 13 has an opening that aligns with respective openings in the plates of the support body 12. A bolt 17 (rivet or other securement device) is provided in the aligned openings in the plates of the support body 12 and the connection arm 13 to secure the collection device 32 to the support body 12 (and thereby securing the collection device 32 to the tuning fork device 30).

Figure 3:
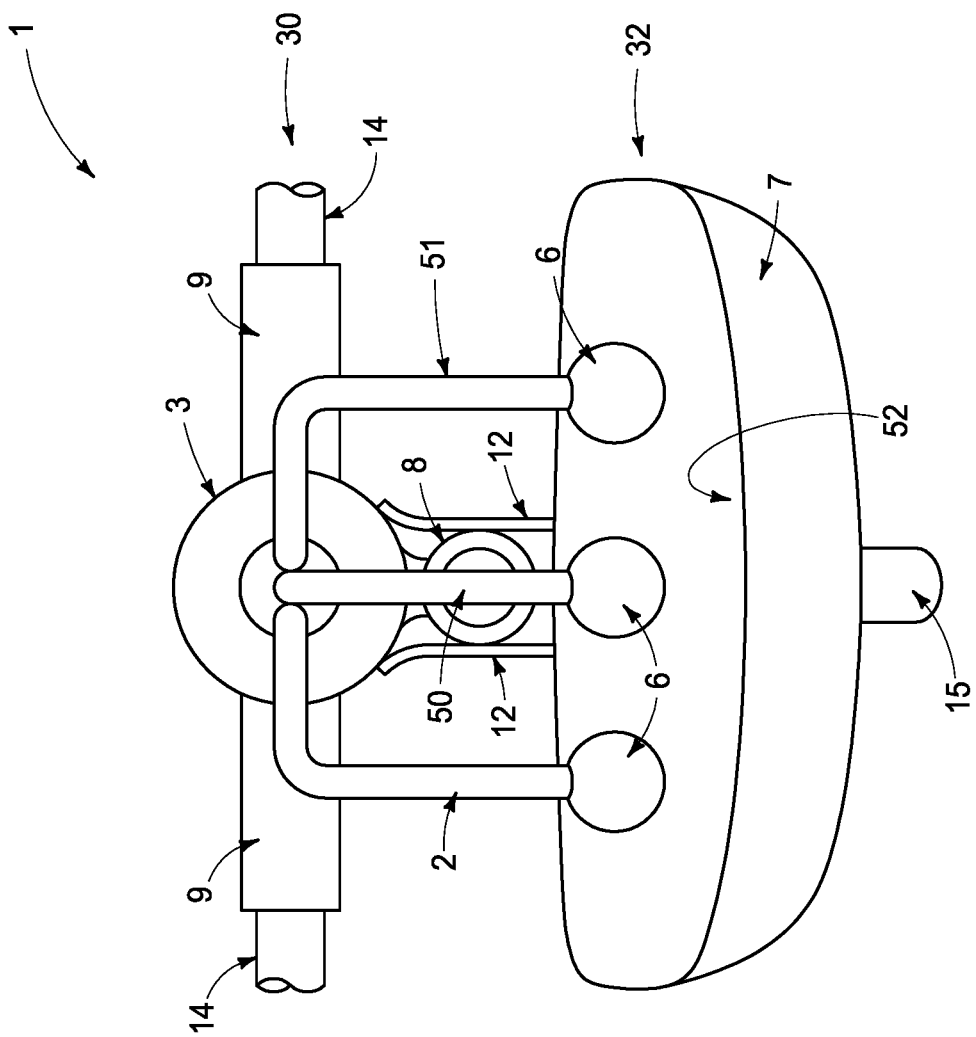
FIG. 3 is a front view of the exemplary end effector of FIG. 1.

Referring to FIG. 3, this front view of the end effector 1 illustrates that the prongs 2, 50 and 51 of the tuning fork device 30 are directly over the opening 52 of the collection device 32.

Figure 5:
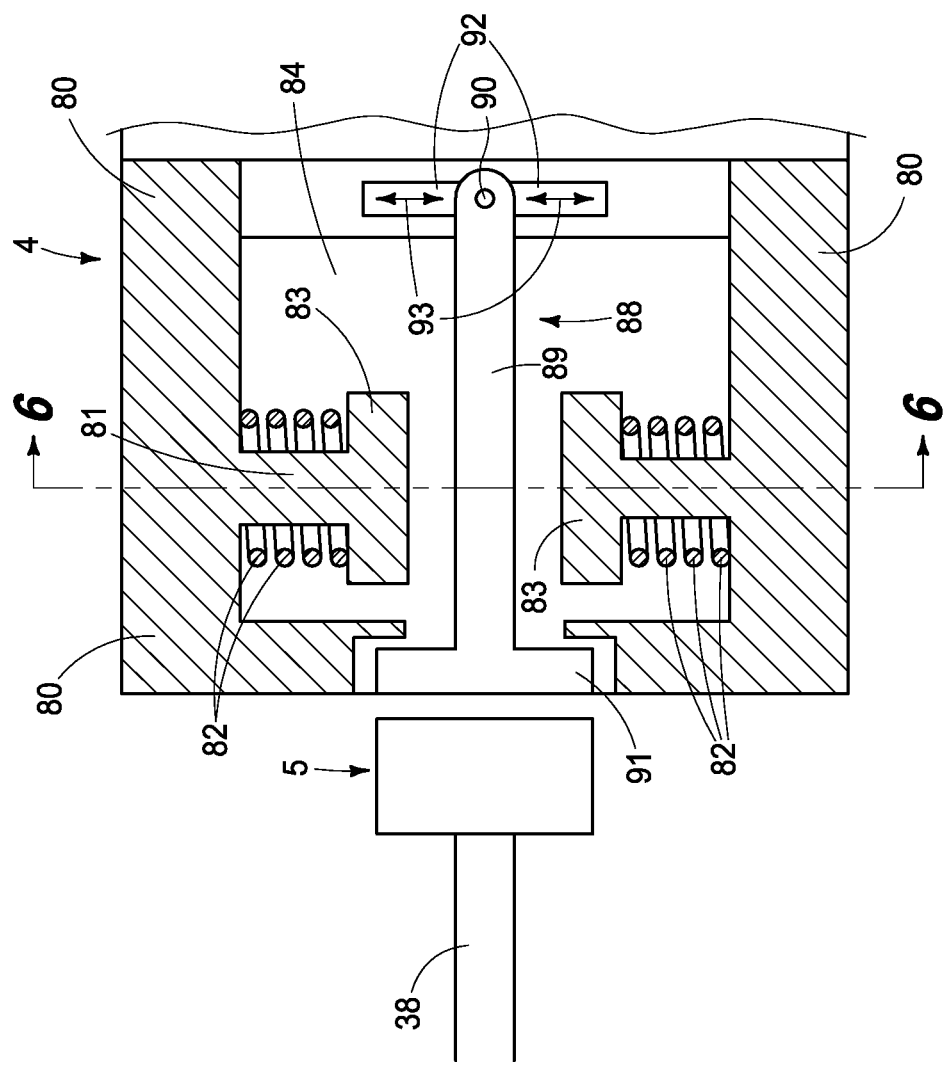
FIG. 5 is a sectional view of an exemplary oscillating device in the end effector of FIG. 1 according to an embodiment of the invention.
Figure 6:
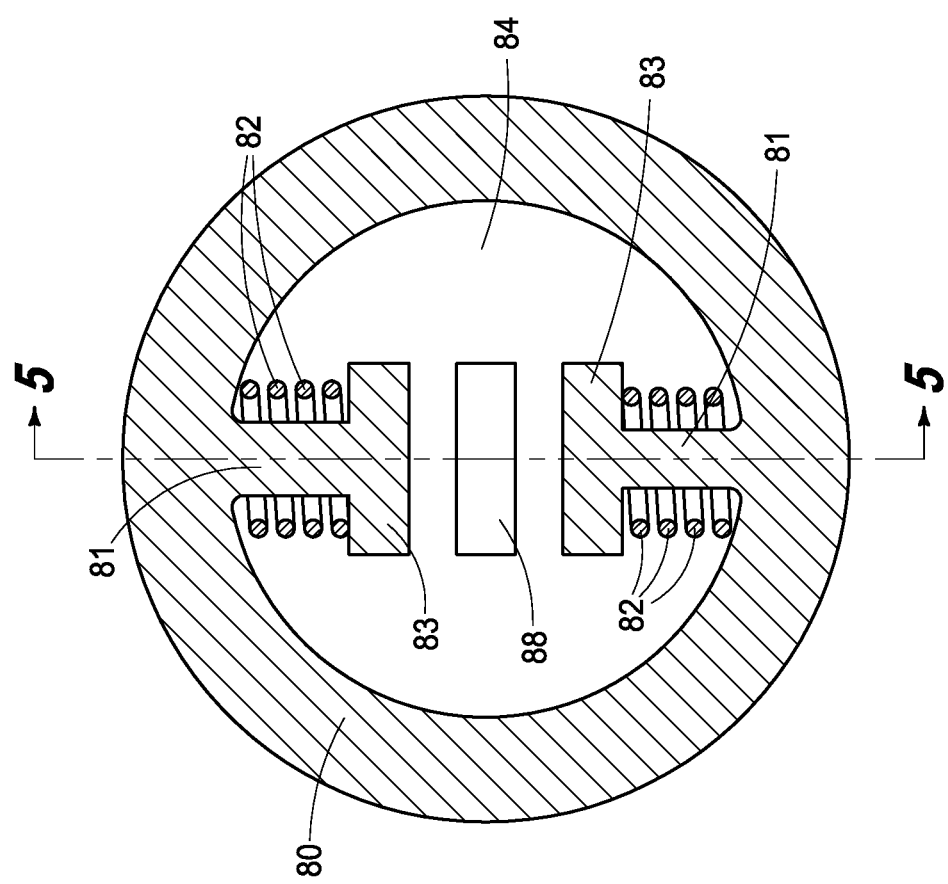
FIG. 6 is a sectional view of the oscillating device of FIG. 5 taken along lines 6-6 of FIG. 5.

Referring to FIGS. 5 and 6, an exemplary oscillator 4 in the tubular housing 3 of the end effector 1 is illustrated according to one embodiment of the invention. In one embodiment, an exemplary oscillating device (oscillator) 4 is a solenoid actuator. The solenoid actuator 4 includes a cylindrical body 80 surrounding (or defining) a central cavity 84. Extending into the cavity 84 from an inner surface of the body 80 are two coil cores 81. Each coil core 81 extends from directly opposite portions of the inner wall of the body 80, and therefore, each coil core 81 extends directly outward from the inner wall toward each other. Each coil core 81 terminates to form a stop portion 83. There is a space in the cavity 84 between the two stop portions 83. An electrical coil 82 surrounds each coil core 81 and can be referenced as an electromagnetic coil 82. The electromagnetic coil 82 extends between the inner wall of the body 80 and the stop portion 83 of the coil core 81.

Still referring to FIGS. 5 and 6, the solenoid actuator 4 includes an armature 88. Armature 88 is configured with a linear stem 89 that extends through the space in the cavity 84 between the two stop portions 83 of the respective coil cores 81. One end of the linear stem 89 forms a head portion 91 that is proximate, and magnetically coupled to, the magnet 5 in the tubular housing 3 of the end effector 1 (magnet 5 was discussed previously). An opposite end of the linear stem 89 of the armature 88 has an opening that receives a securement pin 90. The securement pin 90 extends through the opening in the armature 88 and slidingly engages a slot 92 in the body 80 of the solenoid actuator 4. Each electromagnetic coil 82 is in electrical communication with an electrical power supply not shown for simplicity. Exemplary electrical circuit coupling each electromagnetic coil 82 to an electrical power supply is a frequency controlled oscillator circuit according to one embodiment of the invention.

It should be understood that the entire structure of the armature 88 is capable of moving (or sliding) back and forth in alternating directions 93 between the respective stop portions 83. It should be further understood that the body 80 (including the coil core 81 and stop portion 83) and armature 88 are made of magnetic material, and an exemplary magnetic material is iron. In other embodiments, exemplary magnetic materials for armature 88 include chromium, uranium, aluminum, copper, cobalt, platinum and nickel, and any combination of these magnetic materials. That is, the metallic compounds and alloys with magnetic materials are also magnetic in nature.

It should be further understood that activating the frequency-controlled oscillator circuit to provide electrical power to one of the electromagnetic coils 82 will result in the armature 88 being attracted to, or repulsed from (depending on the polarity of the current), the one electromagnetic coil 82 (can be thought of as being attracted to, or repulsed from, the coil core 81). It should be additionally understood that one embodiment of the invention includes one frequency-controlled oscillator circuit for one electromagnetic coil 82 configured to be 180 degrees out of phrase with the other frequency-controlled oscillator circuit for the other electromagnetic coil 82. In this fashion, activating both frequency-controlled oscillator circuits at the same time will result in the armature 88 being attracted to one coil core and at the same time being repulsed by the other coil core.

Method of Use

Referring to FIGS. 1-6, an exemplary method for using the end effector 1 is described according to one embodiment of the invention. The pivot pins 14 secure the end effector 1 to an arm of a harvesting machine. The harvesting machine is provided in a produce patch such as a blueberry patch.

The exemplary method for using the end effector 1 further includes activating both frequency-controlled oscillator circuits at the same time to power the electromagnetic coils 82. Powering the electromagnetic coils 82 at a preselected frequency results in the coil cores 81 attracting and repelling the armature 88 at the preselected frequency. Accordingly, the armature 88 reciprocally moves in the alternating direction 93 at the preselected frequency. That is, the armature 88 oscillates in direction 93 at the preselected frequency. Since armature 88 is magnetically coupled to magnet 5, magnet 5 also oscillates at the preselected frequency. This oscillation of magnet 5 results in the stem 38 of the tuning fork device 30 to vibrate or oscillate at the preselected frequency. Logically, oscillating the stem 38 results in the oscillation of the prongs 2, 50 and 51 at the preselected frequency.

The exemplary method for using the end effector 1 further includes driving air from the fluid source (air source) through the plurality of holes 36, up through the opening 52 in collection device 32, and through the prongs 2, 50 and 51. Moreover, a vacuum is established in the collection device 32 to create a suction action (via a vacuum) in opening 52.

The camera 8 locates a cluster of blueberries to be acquired and coordinates movement of the arm of the harvesting machine to position the end effector 1 below the cluster. The arm next moves the end effector 1 up through the cluster. As the prongs 2, 50 and 51 move through the cluster, the air from the plurality of holes 36 forces leaves and debris from the blueberries to expose the blueberries to the prongs 2, 50 and 51. At the same time, the vibrating prongs 2, 50 and 51 impart a vibration to the stems and blueberries at the preselected frequency to selectively release the mature blueberries from the stem. Once released, the blueberries drop into the opening 52 of the collection device 32 where the vacuum pulls the blueberries through the collection device 32, through the conduit 10, and ultimately the berries are received in the harvesting machine.

The blueberries are received in the harvesting machine in the highest degree of quality. The energy in the vibrating prongs 2, 50 and 51 is minimal, and therefore, the energy transferred to the stems and blueberries is minimal allowing for the blueberries to be released from the stem without imparting an amount of energy that damages or decreases the quality of the blueberries. Additionally, since the frequency of the oscillation for the prongs 2, 50 and 51 can be selectively adjusted by the weights 6, the oscillation frequency can be selected to release only the ripe (mature) blueberries and leave the immature (unripe) blueberries on the stem to ripen for another day. Moreover, the oscillation frequency can be selected to release only berries of a specific size and/or a specific weight.

For all the end effectors disclosed in this document, and all parts, sections and components discussed herein, the following is information that is applicable. An exemplary range of various materials for the collection device of an exemplary end effector include polymers, plastics, plastic injection mold materials, fiberglass, metals, stainless steel, sheet metal, spring steel, aluminum, bronze, copper, reinforced tin, manganese, nickel, zinc, non-metals or metalloids, and polyethylene, or any combination of these various materials.

For all the end effectors disclosed in this document, and all parts, sections and components discussed herein, the following is information that is applicable. An exemplary range of various materials for the support body of an exemplary end effector include polymers, plastics, plastic injection mold materials, fiberglass, metals, stainless steel, sheet metal, spring steel, aluminum, bronze, copper, reinforced tin, manganese, nickel, zinc, non-metals or metalloids, and polyethylene, or any combination of these various materials.

For all the end effectors disclosed in this document, and all parts, sections and components discussed herein, the following is information that is applicable. An exemplary range of various materials for the prongs for an exemplary end effector includes metals, stainless steel, sheet metal, spring steel, aluminum, bronze, copper, any alloy, copper alloy reinforced tin, manganese, nickel, zinc, and spring steel coated with a plastic, for example, a rigid plastic.

For all the end effectors disclosed in this document, and all parts, sections and components discussed herein, the following is information that is applicable. An exemplary range of total number of prongs for an exemplary end effector is 1 to 10 prongs (or more) with 6 prongs being a specific example other than the 3 prongs disclosed.

For all the end effectors disclosed in this document, and all parts, sections and components discussed herein, the following is information that is applicable. An exemplary range of various materials for the weights of an exemplary end effector includes metals, stainless steel, sheet metal, spring steel, aluminum, bronze, copper, any alloy, copper alloy reinforced tin, manganese, nickel and zinc.

For all the end effectors disclosed in this document, and all parts, sections and components discussed herein, the following is information that is applicable. An exemplary range of weight for the weights 6 of an exemplary end effector includes ½ ounce to 10 ounces with 6 ounces being a specific example.

For all the end effectors disclosed in this document, and all parts, sections and components discussed herein, the following is information that is applicable. An exemplary quantity measurement for the vacuum discussed herein is 6 inHg.

For all the end effectors disclosed in this document, and all parts, sections and components discussed herein, the following is information that is applicable. An exemplary power measurement for the magnet discussed herein is a holding power of 10 pounds with a specific type of magnet being a neodymium magnet.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

What is claimed is:

1. An end effector for harvesting fruit, the end effector comprising:
   a collection device comprising an opening;
   a plurality of prongs over the opening;
   an oscillating device secured to, and in an oscillating relationship with, the plurality of prongs; and
   wherein at least one of the plurality of prongs comprises a composition of material different from a composition of material for at least one other of the plurality of prongs.

2. The end effector of claim 1 further comprising a weight removably secured to at least one of the plurality of the prongs.

3. The end effector of claim 1 wherein the oscillating device comprises a solenoid actuator.

4. The end effector of claim 1 wherein the collection device comprises a plurality of holes configured to a direct a fluid toward the plurality of prongs.

5. The end effector of claim 1 wherein at least one of the plurality of prongs comprises a diameter dimension different from a diameter dimension for at least one other of the plurality of prongs.

6. The end effector of claim 1 further comprising a magnet in a oscillating relationship with the oscillating device.

7. The end effector of claim 1 wherein at least one of the plurality of prongs comprises a metal core coated with plastic.

8. The end effector of claim 1 further comprising a weight removably secured to at least two of the plurality of prongs, the two weights having differing weight dimensions.

9. A method of using an end effector for harvesting fruit, the method comprising:
   providing the end effector proximate fruit to be harvested, the end effector comprising a plurality of prongs;
   oscillating the plurality of prongs; and
   wherein implementing the oscillating comprises providing a magnet in oscillating relationship with an oscillating device, and further comprising selectively modifying the frequency of the oscillating by replacing at least one of the magnets and the oscillating device.

10. The method of claim 9 wherein the providing occurs before the oscillating.

11. The method of claim 9 wherein the oscillating occurs before the providing.

12. The method of claim 9 further comprising directing a fluid toward the plurality of prongs.

13. The method of claim 9 further comprising applying a vacuum at a rear end of the plurality of prongs.

14. The method of claim 9 further comprising selectively modifying the frequency of the oscillating.

15. The method of claim 9 further comprising removably securing a weight to at least one of the plurality of prongs.

16. The method of claim 15 further comprising replacing the weight with a different weight.

17. An end effector for harvesting fruit, the end effector comprising:
 a collection device comprising an opening;
 a plurality of prongs over the opening;
 an oscillating device secured to, and in an oscillating relationship with, the plurality of prongs; and
 a weight removably secured to at least two of the plurality of prongs, the two weights having differing weight dimensions.

* * * * *